United States Patent [19]
Loughran et al.

[11] Patent Number: 6,125,048
[45] Date of Patent: Sep. 26, 2000

[54] METHOD AND APPARATUS FOR ADJUSTING POWER DELIVERED FROM A CENTRAL POWER UNIT TO A REMOTE UNIT VIA A SUPPLY CABLE

[75] Inventors: Kevin Loughran, Randolph, N.J.; Robert B. Ward, Auburn, N.H.

[73] Assignee: Lucent Technologies, Inc., Murray Hill, N.J.

[21] Appl. No.: 09/220,894

[22] Filed: Dec. 28, 1998

[51] Int. Cl.[7] .................................................. H02M 3/04
[52] U.S. Cl. ............................................. 363/78; 323/206
[58] Field of Search ........................ 363/95, 78; 323/205, 323/206

[56] References Cited

U.S. PATENT DOCUMENTS

| | | | |
|---|---|---|---|
| 4,041,455 | 8/1977 | Norberg | 340/146.1 C |
| 4,286,118 | 8/1981 | Mehaffey et al. | 179/18 AD |
| 4,476,535 | 10/1984 | Loshing et al. | 364/480 |
| 5,970,139 | 10/1999 | Koenig et al. | 379/413 |

*Primary Examiner*—Adolf Deneke Berhane
*Attorney, Agent, or Firm*—Dickstein Shapiro; Morin & Oshinsky, LLP

[57] ABSTRACT

A power delivery apparatus and method which calibrates a voltage delivered from a central unit to a remote unit to compensate for losses in the supply lines between the central unit and remote unit is disclosed. The impedance of the supply lines is determined utilizing a reference voltage conducted by a calibration line, a sweep tone transmitted down the supply line, or a time domain reflectometer technique. Based upon the determined impedance of the supply lines, the voltage delivered from the central unit can be calibrated accordingly. Alternatively, the impedance can be determined and the voltage calibrated based on the measured input voltage to the remote unit or the measured power level of a signal transmitted from the remote unit.

47 Claims, 5 Drawing Sheets

METHOD AND APPARATUS FOR ADJUSTING POWER DELIVERED FROM A CENTRAL POWER UNIT TO A REMOTE UNIT VIA A SUPPLY CABLE

BACKGROUND OF THE INVENTION

1. Field of the Invention

The present invention relates generally to a method and apparatus for providing power to remotely located units using power supply lines or cables connected directly to central equipment serving the remote units.

2. Description of the Related Art

In many telecommunication systems, it is advantageous to power remotely located units, such as remote radio units, using power supply lines or cables connected to central equipment serving the remote units. The power from the central unit is typically converted by a power supply in the remote unit to provide the power necessary for the remote unit. This arrangement is generally more effective and less costly than using an external power supply for the remote units. In using central equipment to supply power to remotely located units, however, specific requirements must be met. Namely, the current and voltage supplied to the remote units must be strictly controlled. In addition, the power and heat dissipation of the conversion power supply in the remote units are limited and the electrical noise generated in the remote units must be kept extremely low. Further, the cost of the power supply in the remote unit for converting the power supplied from the central equipment must be kept low.

A key factor limiting the effective control of the aforementioned requirements is the variable line length of the cables connecting the central equipment to the remote units. The distance from the power source in the central equipment to each remote unit connected to the central equipment may vary. As such, the length of the cables necessary for connection of the central unit to each remote unit will vary accordingly. Because of the variable length of cables that may be required for each remote unit, the impedance of the power delivery system differs from remote unit to remote unit. This limits the effective control of the current and voltage applied to each remote unit.

Figure 1:
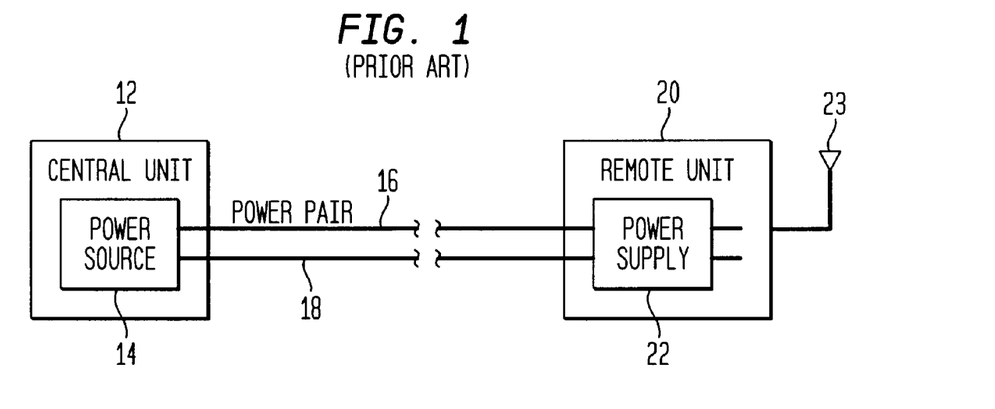
FIG. 1 is a block diagram of a conventional power delivery system including a central unit and a remote unit.
Figure 2:
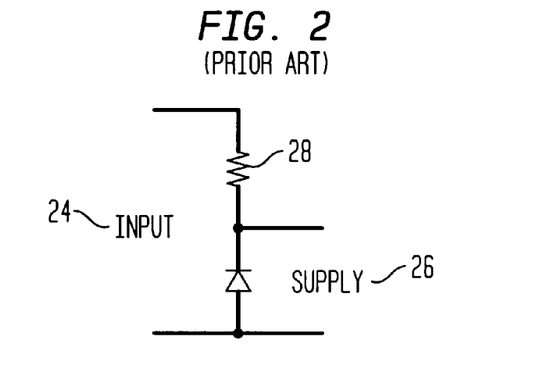
FIG. 2 is a block diagram of a conventional linear power supply.

With reference to FIG. 1, a typical power delivery arrangement exhibiting the aforementioned limitations is shown. An in-building wireless telecommunication system is an exemplary system in which power delivery systems may be used. A power source 14 is controlled by central unit 12 to provide power to power supply 22 of remote unit 20. In a wireless telecommunication system, remote unit 20 may be a remote radio unit for transmission of signals via antenna 23. In this arrangement, power is transmitted from power source 14 to power supply 22 via power transmission lines 16 and 18. Currently, power conversion in remote unit 20 is accomplished using either a linear power supply or a switching power supply within remote unit 20. Each of these power supplies has distinct disadvantages which limit the effective control of power supplied to remote units. With reference to FIG. 2, a linear power supply 28 is illustrated in which power is converted as it passes from the input 24 to the supply 26. The use of a linear power supply 28 at the remote unit 20 may have a very inefficient power conversion, and may also be quite dependent on the voltage drop across the supply cables. This tends to limit the line length of the cables. In addition, there is often quite a bit of heat dissipation associated with such an approach.

Figure 3:
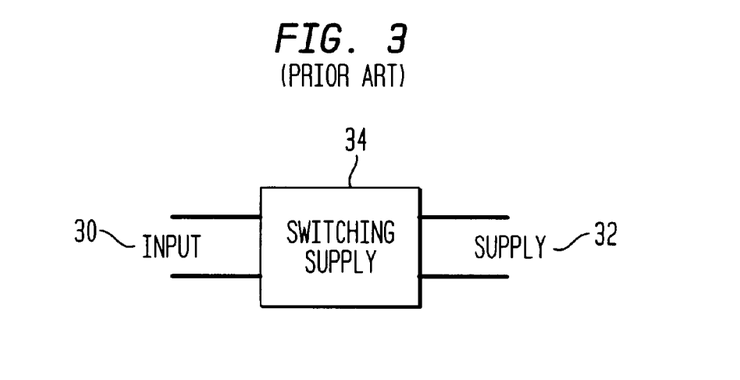
FIG. 3 is a block diagram of a conventional switching power supply.

With reference to FIG. 3, a switching power supply 34 is shown in which power is converted as it passes from input 30 to supply 32. A switching power supply 34 is advantageous over a linear power supply 28 because it is more tolerant of large swings in input voltage. However, switching power supplies tend to be more expensive, and they produce considerable electrical noise.

Thus, there exists a need for an inexpensive, efficient power delivery system that provides power to remotely located units from a centrally located power source which includes a calibration system that can effectively compensate for voltage drops caused by the impedance of the supply cables.

SUMMARY OF THE INVENTION

In accordance with the present invention, a power delivery system, method and apparatus are described and illustrated which do not exhibit the drawbacks associated with previous approaches. According to the present invention, a variable power source in the central unit is calibrated, based on the impedance of the supply lines within the power cable connecting the central unit to a remote unit, to deliver a voltage which compensates for the impedance of the supply lines to a linear power supply in the remote unit. Alternatively, the power source in the central unit can be calibrated to compensate for losses in the supply lines based on the measured voltage being input to the remote unit, or the measured output power of a transmitter located in the remote unit. The delivery of a voltage which compensates for the losses associated with the impedance of the supply lines to the linear power supply allows the linear power supply to be designed for small input voltage variations, thereby considerably decreasing the power conversion inefficiencies and reducing the power and heat dissipation required by the remote unit.

According to a first preferred embodiment, the calibration is performed by determining the impedance of the supply lines utilizing a pre-determined reference voltage signal applied by the remote unit to calibration lines contained within the power cable connected between the remote unit and the central unit. The central unit measures the voltage drop in the reference voltage signal to determine the impedance in the calibration lines, which corresponds to the impedance of the supply lines, and adjusts the voltage applied to the supply cable accordingly.

According to a second preferred embodiment, the calibration is performed by determining the impedance of the supply lines using an AC coupled sweep tone generated at the central unit which is transmitted down the supply lines to a known impedance at the remote unit and returned to the central unit. At the central unit, the impedance is determined based upon the loss measured in the sweep tone, and the voltage applied to the supply lines adjusted accordingly.

According to a third preferred embodiment, the calibration is performed by determining the impedance of the supply lines using a Time Domain Reflectometer (TDR) measurement technique, and adjusting the voltage applied to the supply lines accordingly.

According to a fourth preferred embodiment, the calibration is performed by measuring the voltage supplied at the remote unit and communicating the measured voltage back to the central unit via a telemetry link. The central unit can then adjust the voltage supplied to the remote unit accordingly.

According to a fifth preferred embodiment, the calibration is performed by measuring the power level of a signal output by a signal transmitter in the remote unit and communicating the measured power level to the central unit via a telemetry link. The central unit can then adjust the voltage supplied to the remote unit accordingly.

These and other features and advantages of the invention will become more apparent from the following detailed description of preferred embodiments of the invention which are provided in connection with the accompanying drawings.

DETAILED DESCRIPTION OF PREFERRED EMBODIMENTS

The present invention will be described as set forth in the preferred embodiments illustrated in FIGS. 4–8. Other embodiments may be utilized and structural or logical changes may be made without departing from the spirit or scope of the present invention. Like elements are referred to by like numerals in the drawings.

Figure 4:
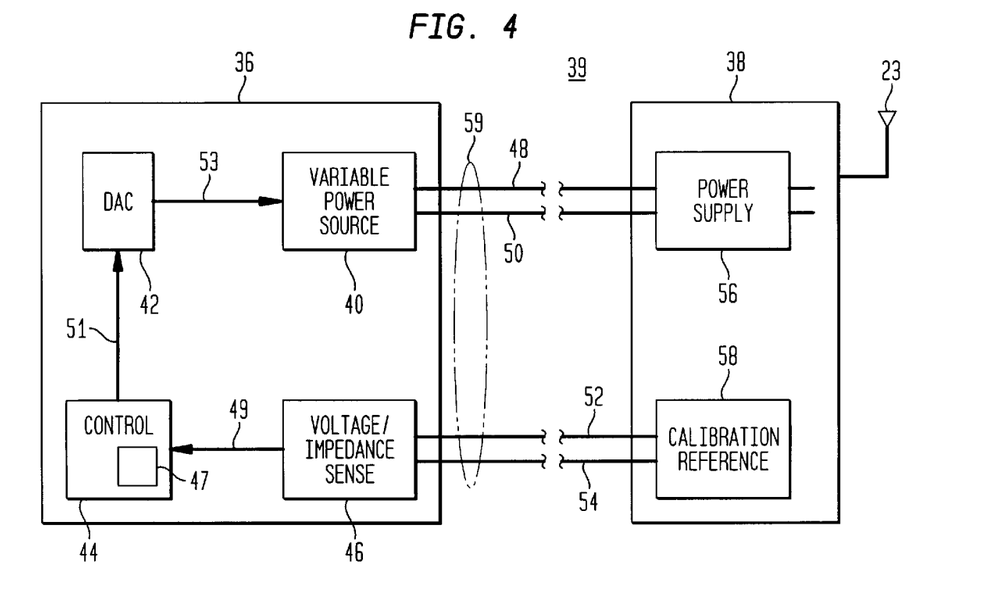
FIG. 4 is a block diagram of a power delivery system in accordance with a first preferred embodiment of the invention.

According to the present invention, power is provided to a remote unit using a variable power source to produce optimum voltage based upon the measured impedance of the power supply lines. FIG. 4 shows a simplified block diagram of a first preferred embodiment of the invention incorporating the power delivery system of the present invention. Referring to FIG. 4, the power delivery apparatus 39 includes a central unit 36 and a remote unit 38 which are connected by a cable 59. Remote unit 38 may be, for example, a remote radio unit in a wireless telecommunication system for transmitting signals via antenna 23. Cable 59 includes power transmission lines 48 and 50 and calibration lines 52 and 54. Alternatively, calibration lines 52, 54 may be provided as a separate cable. The central unit 36 includes a voltage/impedance sensor 46, a control section 44, a digital-to-analog converter 42, and a variable power source 40. The remote unit 38 includes a power supply unit 56 and a calibration reference signal producing circuit 58.

The control section 44 of the central unit 36 manages overall control of the central unit 36 including the voltage output of variable power source 40. Control section 44 may include a CPU 47 (a central processor unit which may be a microprocessor, a digital signal processor, a micro-controller or other programmable logic device). The control section 44 is connected to voltage/impedance sensor 46 via line 49. The control section 44 is connected to variable power source 40 through digital-to-analog converter 42 via lines 51 and 53.

Operation of the present invention shown in FIG. 4 will now be described. During normal operation of the power delivery apparatus 39, power is supplied from the central unit 36 to the remote unit 38 via cable 59 on power transmission lines 48 and 50. During power transmission, a reference voltage is generated and applied to calibration lines 52 and 54 of cable 59 by calibration signal producing circuit 58. The impedance sensor 46 determines the impedance of the calibration lines 52 and 54 by measuring the drop in the reference voltage across the calibration lines 52, 54. Once determined, the impedance sensor 46 sends a signal representing the determined impedance to the control section 44 via line 49.

Since both transmission lines 48, 50 and calibration lines 52, 54 are connected between the central unit 36 and the remote unit 38, the length of calibration lines 52, 54 is approximately the same as the length of the transmission lines 48, 50. Accordingly, the impedance of each will be approximately equal. Control section 44, in response to the signal received from sensor 46, will calibrate the voltage applied to the remote unit 38 by causing variable power source 40 to adjust the level of the voltage applied to transmission lines 48, 50 for transmission to remote unit 38.

For example, if a high impedance for calibration lines 52, 54 is determined, which indicates a corresponding high impedance for transmission lines 48, 50, variable power source 40 may adjust, i.e., increase, the voltage applied to the power transmission lines 48, 50 to compensate for the losses, i.e., voltage drop, due to the high impedance of transmission lines 48, 50. In accordance with the present invention, by increasing the voltage output from variable power source 40 to compensate for losses due to the impedance of the transmission lines 48, 50, the resulting voltage input to power supply 56 of remote unit 38 will remain within the specified tolerance for the input voltage of power supply 56.

If a low impedance for calibration lines 52, 54 is determined, which indicates a corresponding low impedance for transmission lines 48, 50, variable power source 40 may adjust, i.e., decrease, the voltage applied to the power transmission lines 48, 50 since there may be only a small drop in the voltage due to the low impedance of transmission lines 48, 50. In accordance with the present invention, by decreasing the voltage output from variable power source 40, the resulting voltage input to power supply 56 of remote unit 38 will remain within the specified tolerance for the input voltage of power supply 56.

Figure 5:
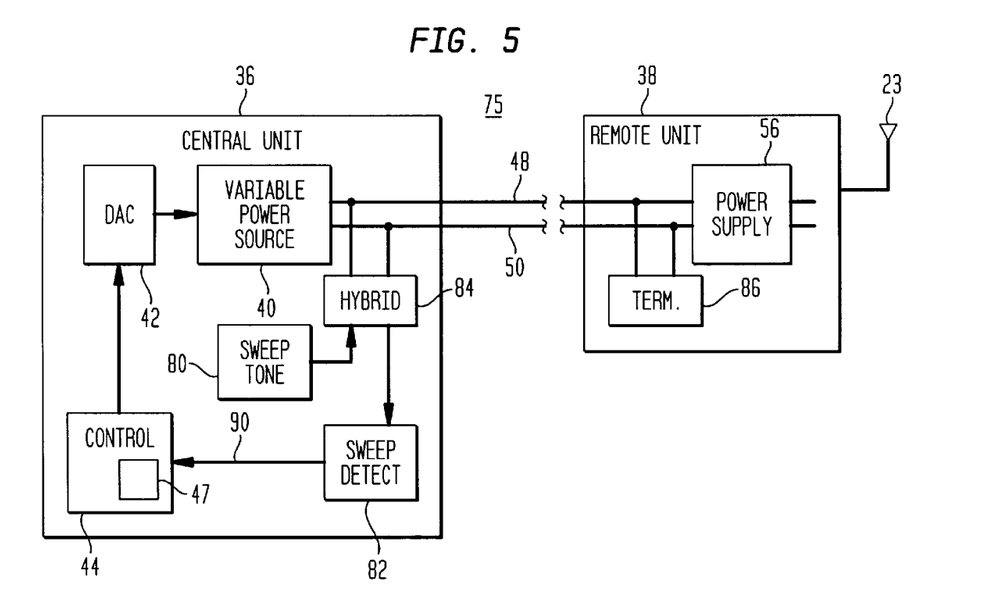
FIG. 5 is a block diagram of a power delivery system in accordance with a second preferred embodiment of the invention.

FIG. 5 shows a simplified block diagram of a second preferred embodiment of the invention incorporating the power delivery system of the present invention. Referring to FIG. 5, a power delivery apparatus 75 is shown including a central unit 36 and a remote unit 38 which are connected by power transmission lines 48 and 50. Remote unit 38 may be, for example, a remote radio unit of a wireless telecommunication system for transmitting signals via antenna 23. The central unit 36 includes a control section 44, a digital-to-analog converter 42, a sweep tone generator 80, a sweep tone detect device 82, a hybrid transformer 84 and a variable power source 40. The remote unit 38 includes a power supply unit 56 and a reflective termination unit 86.

The control section 44 of the central unit 36 manages overall control of the central unit 36 including the voltage output of variable power source 40. Control section 44 includes a CPU 47. The control section 44 is connected to sweep tone measuring device 82 via line 90.

Operation of the FIG. 5 embodiment will now be described. During normal operation of the power delivery apparatus 75, power is supplied from the central unit 36 to the remote unit 38 via power transmission lines 48, 50. Sweep tone generator 80 generates a sweep tone of a known magnitude and bandwidth. The generated sweep tone is coupled onto the transmission lines 48, 50 by hybrid transformer 84 as is typically done in loop telephony. The AC coupled sweep tone is transmitted down the transmission lines 48, 50 to the reflective termination unit 86 in remote unit 38. Termination unit 86 reflects the AC coupled sweep tone back to the central unit 36, where sweep tone detect device 82 measures the power of the reflected signal through hybrid transformer 84. The measured power of the return signal is input to control section 44 via line 90. Control section 44 then determines the impedance of transmission lines 48, 50 based upon the power loss measured in the sweep tone. Once the impedance of transmission lines 48, 50 has been determined, the control section 44 prompts the variable power source 40 to adjust the voltage applied to the power transmission lines 48, 50 based on the determined impedance similarly to that as described above with reference to FIG. 4.

Figure 6A:
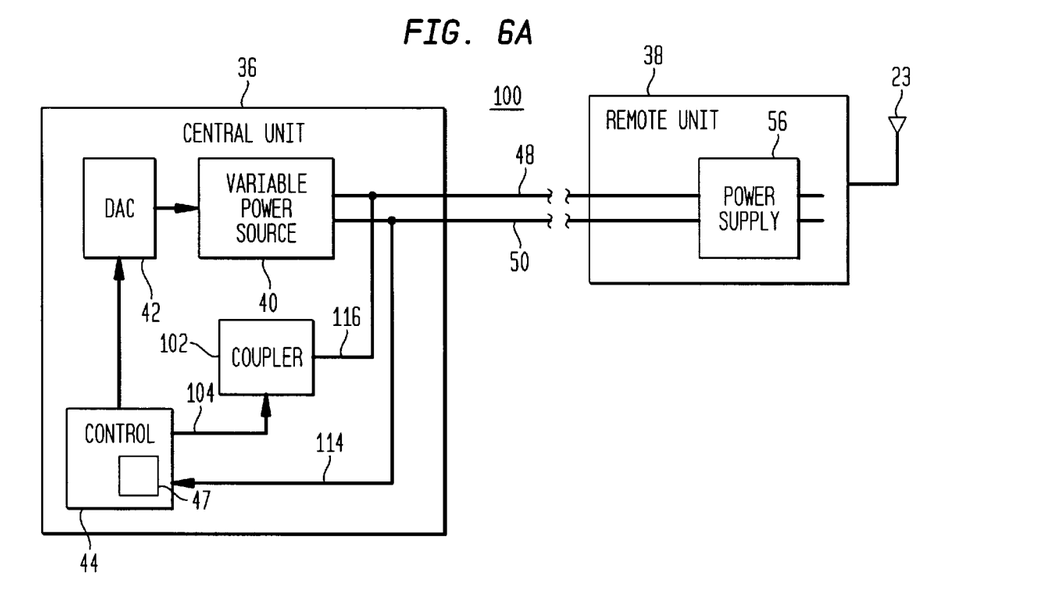
FIG. 6A is a block diagram of a power delivery system in accordance with a third preferred embodiment of the invention.

FIG. 6A illustrates a power delivery system in accordance with a third preferred embodiment of the present invention. Referring to FIG. 6A, a power delivery apparatus 100 is shown including a central unit 36 and a remote unit 38 which are connected by power transmission lines 48 and 50. Remote unit 38 may be, for example, a remote radio unit of a wireless telecommunication system for transmitting signals via antenna 23. The central unit 36 includes a control section 44 with an input connected to transmission line 50 via line 114, a digital-to-analog converter 42, a variable power source 40, and a coupler 102, such as for example a tri-state buffer, having an input connected to control section 44 by line 104 and an output connected to transmission line 50 by line 116. Alternatively, lines 114 and 116 could be connected to transmission line 48 instead of transmission line 50, or connected to both transmission lines 48, 50. The remote unit 38 includes a power supply unit 56.

The control section 44 of the central unit 36 manages overall control of the central unit 36 including the voltage output of variable power source 40. Control section 44 includes a CPU 47.

Operation of the FIG. 6A embodiment will now be described. During normal operation of the power delivery apparatus 100, power is supplied from the central unit 36 to the remote unit 38 via power transmission lines 48, 50. A short rise time pulse is sent by control section 44 through coupler 102 to transmission line 50 via line 116. The pulse is also input back into control section 44 through line 114. The pulse will travel down transmission line 50 and reflect back to central unit 36 after encountering an impedance discontinuity, such as remote unit 38.

Figure 6B:
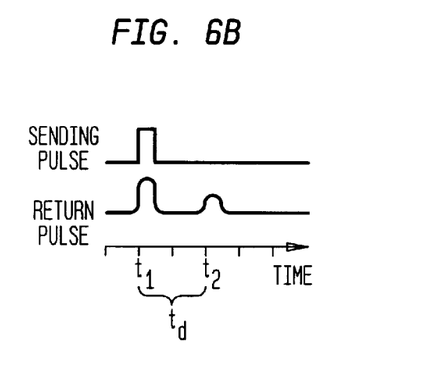
FIG. 6B illustrates an example of the sending pulse and return pulse generated in the circuit of FIG. 6A.

FIG. 6B illustrates a diagram of the sending pulse and return pulse. The sending pulse is output at time $t_1$ on line 116. The sending pulse is sent down transmission line 50 and is also seen as a return pulse by control section 44 via line 114. The sending pulse will be reflected back to central unit 36 at some time $t_2$ and input to control section 44 via line 114. Control section 44 can determine the time delay $t_d$ between the sending pulse and the return pulse and determine the length of the transmission line 50 based upon the determined delay. Once the length of transmission line 50 is determined, the impedance of transmission line 50 can be determined by control section 44 based upon the length. Once the impedance has been determined, the control section 44 prompts the variable power source 40 to adjust the voltage applied to the power transmission lines 48, 50 similarly to that as described above with reference to FIG. 4.

Figure 7A:
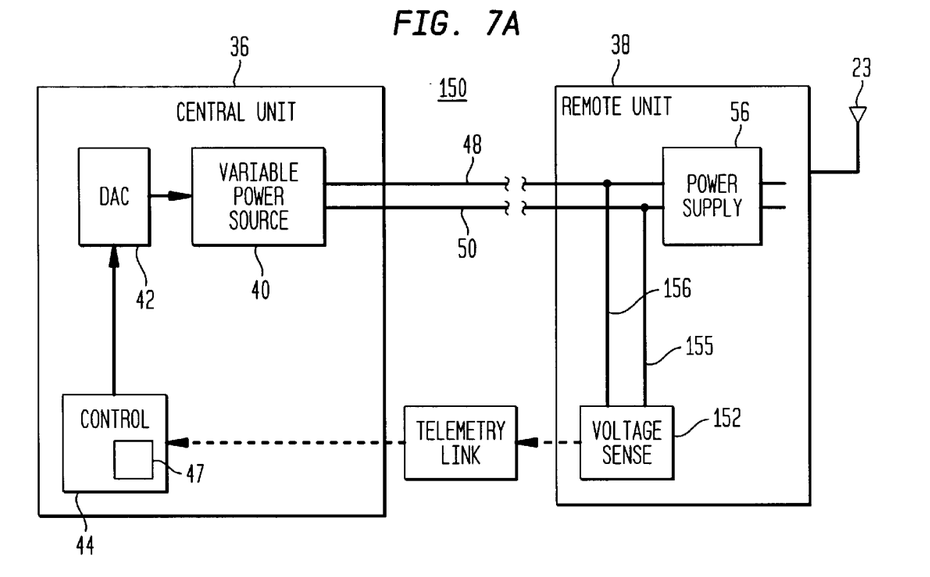
FIGS. 7A and 7B illustrate a block diagram of a power delivery system in accordance with a fourth preferred embodiment of the invention.

FIG. 7A shows a simplified block diagram of a fourth preferred embodiment of the invention incorporating the power delivery system of the present invention. Referring to FIG. 7A, a power delivery apparatus 150 is shown including a central unit 36 and a remote unit 38 which are connected by power transmission lines 48 and 50. Remote unit 38 may be, for example, a remote radio unit of a wireless telecommunication system for transmitting signals via antenna 23. The central unit 36 includes a control section 44, a digital-to-analog converter 42, and a variable power source 40. The remote unit 38 includes a power supply unit 56 and a voltage sense unit 152.

The control section 44 of the central unit 36 manages overall control of the central unit 36 including the voltage output of variable power source 40. Control section 44 includes a CPU 47.

Operation of the FIG. 7A embodiment will now be described. During normal operation of the power delivery apparatus 150, power is supplied from the central unit 36 to the remote unit 38 via power transmission lines 48, 50. Voltage sense unit 152 measures, using lines 155,156, the voltage delivered to power supply 56 in remote unit 38. The measured voltage is communicated back to control section 44 of central unit 36 via a telemetry link between central unit 36 and remote unit 38. Control unit 44, based on the voltage measured by voltage sense 152 which represents the impedance of the transmission lines 48, 50, prompts the variable power source 40 to adjust the voltage applied to the power transmission lines 48, 50.

Figure 7B:
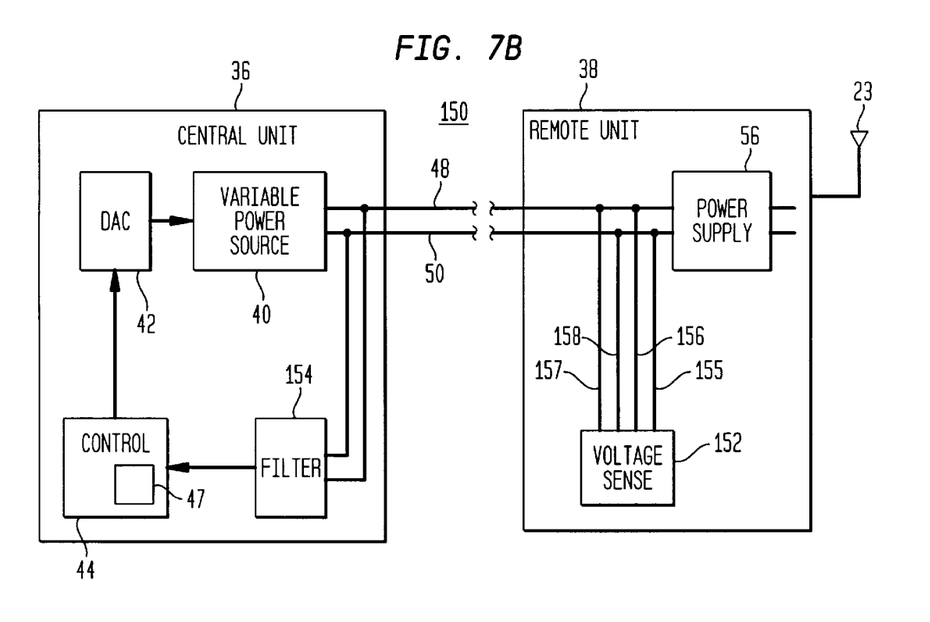

Alternatively, as illustrated in FIG. 7B, a signal indicating the measured voltage can be communicated back to central unit 36 via transmission lines 48, 50. Voltage sense 152 measures the voltage being input to power supply 56 via lines 155, 156. A signal is output via lines 157, 158 back onto transmission lines 48, 50 and returned to central unit 36. A filter 154 extracts the signal indicating the measured voltage and inputs a signal representing the impedance of transmission lines 48, 50 to control unit 44, which prompts the variable power source 40 to adjust the voltage applied to the power transmission lines 48, 50.

Figure 8A:
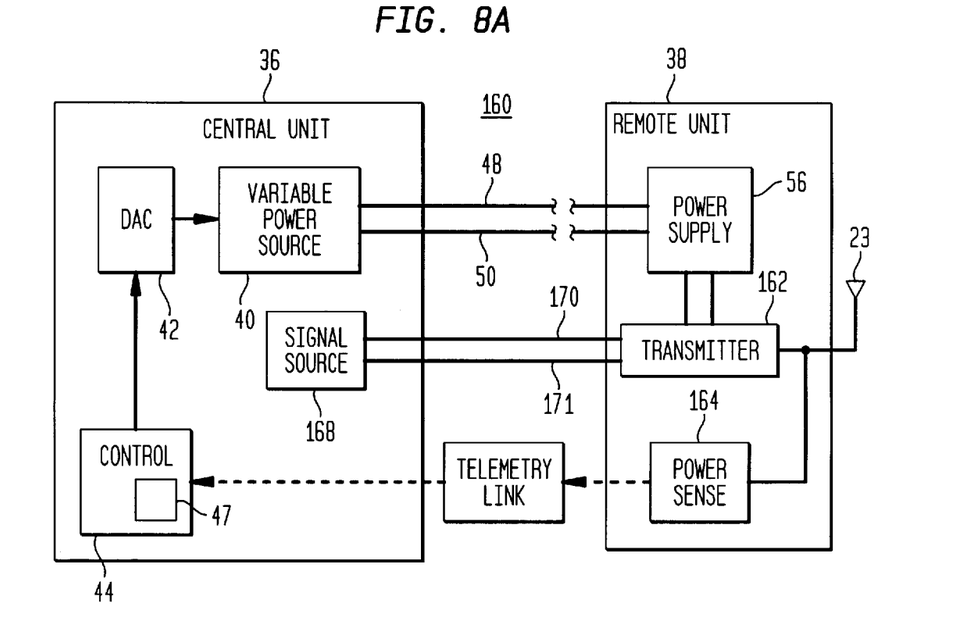
FIGS. 8A and 8B illustrate a block diagram of a power delivery system in accordance with a fifth preferred embodiment of the invention.

FIG. 8A shows a simplified block diagram of a fifth preferred embodiment of the invention incorporating the power delivery system of the present invention. Referring to FIG. 8A, a power delivery apparatus 160 is shown including a central unit 36 and a remote unit 38 which are connected by power transmission lines 48 and 50. Remote unit 38 may be, for example, a remote radio unit of a wireless telecommunication system for transmitting signals via antenna 23. The central unit 36 includes a control section 44, a digital-to-analog converter 42, a variable power source 40, and a signal source unit 168. The remote unit 38 includes a power supply unit 56, a signal transmitter 162 and a power sense unit 164.

The control section 44 of the central unit 36 manages overall control of the central unit 36 including the voltage output of variable power source 40. Control section 44 includes a CPU 47.

Operation of the FIG. 8A embodiment will now be described. During normal operation of the power delivery apparatus 160, power is supplied from the central unit 36 to the remote unit 38 via power transmission lines 48, 50. Transmitter 162 in remote unit 38, in response to a signal from signal source unit 168 in central unit 36 via signal lines 170, 171, generates a transmit signal of a known power level to be sent by remote unit 38. This signal may be sent via antenna 23 of remote unit 38, for example, or could be transmitted by other signal transmission methods as are known in the art. Power sense unit 164 measures the power level of the signal present at the output of transmitter 162 in remote unit 38. Since the signal gain associated with the signal source unit 168 and transmitter 162 are known, the measured power level of the signal output from transmitter 162 is proportional to the impedance, which corresponds to the length, of signal lines 170, 171. Since both transmission lines 48, 50 and signal lines 170, 171 are connected between the central unit 36 and the remote unit 38, the length of signal lines 170, 171 is approximately the same as the length of the transmission lines 48, 50. The measured power level of the output signal is communicated back to control section 44 via a telemetry link between central unit 36 and remote unit 38. Control unit 44, based on the power level of the signal measured by power sense 164, determines the length of signal lines 170, 171 and correspondingly the length of transmission lines 48, 50. Control unit 44, based on the determined length of transmission lines 48, 50, outputs a signal which represents the impedance of transmission lines 48, 50 and prompts the variable power source 40 to adjust the voltage applied to the power transmission lines 48, 50.

Figure 8B:
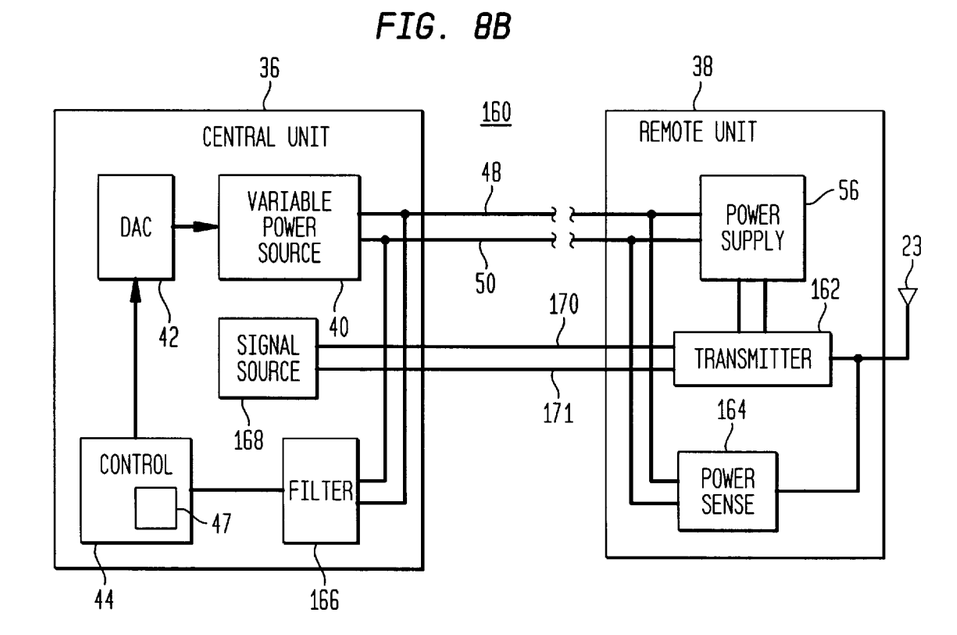

Alternatively, as illustrated in FIG. 8B, a signal indicating the measured output power can be communicated back to central unit 36 via transmission lines 48, 50. Power sense unit 164 measures the power present at the output of transmitter 162. A signal indicating the measured output power is output from power sense unit 164 onto transmission lines 48, 50 and returned to central unit 36. A filter 166 extracts the signal indicating the measured output power and inputs a signal to control unit 44. Control unit 44 outputs a signal representing the impedance of transmission lines 48, 50 which prompts the variable power source 40 to adjust the voltage applied to the power transmission lines 48, 50 based on the output power measured by power sense unit 164.

In accordance with the embodiments as described above, a variable power source in the central unit is set to deliver a voltage, which compensates for losses due to the impedance of the supply lines connecting the central unit to a remote unit, to a linear power supply in the remote unit. This compensation ensures that the level of the voltage signal received by the linear power supply will consistently be within a narrow range, and thus allows the linear power supply to be designed for small input voltage variations. The narrow input range for the linear power supply considerably decreases the power conversion inefficiencies and reduces the power and heat dissipation required by the remote unit.

The above description and accompanying drawings are only illustrative of preferred embodiments that can achieve and provide the objects, features and advantages of the present invention. It is not intended that the invention be limited to the specific embodiments shown and described in detail herein. Accordingly, it should be understood that the invention is not to be considered as being limited by the foregoing description, but is only limited by the scope of the appended claims.

What is claimed as new and desired to be protected by Letters Patent of the United States is:

1. A power control system comprising:
    at least one remote unit, said at least one remote unit including a reference voltage producer;
    a central power unit connected to said at least one remote unit by a supply cable, said central power unit comprising:
        a power source for supplying power to said remote unit via said supply cable;
        a control circuit for providing a signal representing an impedance of said supply cable, said control circuit including a voltage drop detector; and
        a regulator receiving said signal from said control circuit and adjusting said power supplied by said power source to said at least one remote unit in response to said signal,
    wherein said power control system further comprises at least one calibration line connected between said reference voltage producer and said voltage drop detector, and wherein said reference voltage producer outputs a reference voltage on said at least one calibration line to said voltage drop detector, and said voltage drop detector determines said impedance of said supply cable based upon a measured voltage drop across said at least one calibration line.

2. The power control system according to claim 1, wherein said supply cable comprises a plurality of conductors.

3. The power control system according to claim 2, wherein said plurality of conductors in said supply cable includes said at least one calibration line.

4. The power control system according to claim 1, wherein said control circuit further comprises:
    a processor connected to said voltage drop detector for generating said signal.

5. The power control system according to claim 4, wherein said processor includes a microprocessor.

6. The power control system according to claim 1, wherein said remote unit is a remote radio unit used in a wireless telecommunication system.

7. A power control system comprising:
    at least one remote unit;
    a central power unit connected to said at least one remote unit by a supply cable, said central power unit comprising:
        a power source for supping power to said remote unit via said supply cable;
        a control circuit for providing a signal representing an impedance of said supply cable, said control circuit comprising:
            a sweep tone generator coupled to said supply cable, said sweep tone generator generating a sweep tone of a known magnitude, said sweep tone being transmitted down said supply cable to said remote unit and being reflected back to said central unit by said at least one remote unit; and
            a sweep tone measuring device coupled to said supply cable, said sweep tone measuring device measuring a magnitude of said reflected sweep tone and outputting a signal representing said magnitude of said measured reflected sweep tone,
        said control circuit receiving said signal representing said measured magnitude of said reflected sweep tone and generating said signal representing said impedance of said supply cable based on said measured magnitudes, and
        a regulator for receiving said signal representing said impedance from said control circuit and adjusting said power supplied by said power source to said at least one remote unit in response to said signal representing said impedance.

8. The power control system according to claim 7, wherein said sweep tone generator and said sweep tone measuring device are coupled to said supply cable by a hybrid transformer.

9. The power control system according to claim 7, wherein said at least one remote unit further comprises:
a reflective termination unit for reflecting said sweep tone back to said central unit.

10. The power control system according to claim 7, wherein said control circuit includes a processor.

11. The power control system according to claim 10 wherein said processor includes a microprocessor.

12. The power control system according to claim 7, wherein said remote unit is a remote radio unit used in a wireless telecommunication system.

13. A power control system comprising:
at least one remote unit;
a central power unit connected to said at least one remote unit by a supply cable, said central power unit comprising:
a power source for supplying power to said remote unit via said supply cable;
a control circuit for providing a signal representing an impedance of said supply cable; and
a regulator receiving said signal from said control circuit and adjusting said power supplied by said power source to said at least one remote unit in response to said signal,
wherein said control circuit comprises:
a coupler having an input connected to a controller and an output connected to said supply cable, said output further connected to said controller,
wherein a pulse is sent from said controller through said coupler down said supply cable to said at least one remote unit and reflected back to said central unit, and said controller generates said signal based on a time delay between said pulse sent by said controller and said pulse reflected back to said central unit.

14. The power control system according to claim 13, wherein said coupler includes a tri-state buffer.

15. The power control system according to claim 13, wherein said controller includes a processor.

16. The power control system according to claim 15, wherein said processor includes a microprocessor.

17. The power control system according to claim 13, wherein said remote unit is a remote radio unit used in a wireless telecommunication system.

18. A power control system comprising:
at least one remote unit, said at least one remote unit including a transmitter and a power sensing unit for measuring a signal being output by said transmitter and outputting a signal representing a power of said measured output signal;
a central power unit connected to said at least one remote unit by a supply cable, said central power unit comprising:
a power source for supplying said power to said remote unit via said supply cable;
a control circuit for providing a signal representing an impedance of said supply cable; and
a regulator receiving said signal from said control circuit and adjusting said power supplied by said power source to said at least one remote unit in response to said signal from said control circuit,
wherein said control circuit of said central power unit receives said signal output from said power sensing unit and generates said signal representing said impedance of said supply cable based on said signal output from said power sensing unit.

19. The power control system according to claim 18, wherein said central power unit further comprises:
a signal source unit connected to said transmitter of said at least one remote power unit, said signal source unit being adapted to prompt said transmitter to output said signal.

20. The power control system according to claim 18, wherein said signal representing said power of said measured output signal is transmitted to said control circuit via a telemetry link.

21. The power control system according to claim 18, wherein said signal representing said power of said measured output signal is transmitted to said control circuit via said supply cable.

22. The power control system according to claim 18, wherein said control circuit includes a processor.

23. The power control system according to claim 22, wherein said processor includes a microprocessor.

24. The power control system according to claim 18, wherein said remote unit is a remote radio unit used in a wireless telecommunication system.

25. A central power control unit for supplying power over a supply cable to a remote unit, said central power control unit comprising:
a power source for supplying said power;
a control circuit for providing a signal representing an impedance of said supply cable; and
a regulator receiving said signal from said control circuit and adjusting said power supplied by said power source over said supply cable in response to said signal,
wherein said control circuit further comprises:
a sweep tone generator coupled to said supply cable, said sweep tone generator generating a sweep tone of a known magnitude, said sweep tone being transmitted down said supply cable to said remote unit and being reflected back to said central unit by said remote unit; and
a sweep tone measuring device coupled to said supply cable, said sweep tone measuring device measuring a magnitude of said reflected sweep tone and outputting a signal representing said magnitude of said measured reflected sweep tone,
said control circuit receiving said signal representing said measured magnitude of said reflected sweep tone and generating said signal representing said impedance of said supply cable based on said measured magnitude.

26. The central power control unit according to claim 25, further comprising:
a hybrid transformer for coupling said sweep tone generator and said sweep tone measuring device to said supply cable.

27. The central power unit according to claim 25, wherein said control circuit includes a processor.

28. The central power unit according to claim 27, wherein said processor includes a microprocessor.

29. A central power unit for supplying power over a supply cable to a remote unit, said central power control unit comprising:
a power source for supplying said power;
a control circuit for providing a signal representing an impedance of said supply cable; and
a regulator receiving said signal from said control circuit and adjusting said power supplied by said power source over said supply cable in response to said signal,
wherein said control circuit further comprises:
a coupler having an input connected to a controller and an output connected to said supply cable, said output further connected to said controller, wherein a pulse is sent from said controller through said coupler down said supply cable to said remote unit and reflected back to said central unit, and said controller generates said signal based on a time delay between said pulse sent by said controller and said pulse reflected back to said central unit.

30. The central power unit according to claim 29, wherein said coupler includes a tri-state buffer.

31. The central power unit according to claim 29, wherein said controller includes a processor.

32. The central power unit according to claim 31, wherein said processor includes a microprocessor.

33. A central power control unit for supplying power over a supply cable to a remote unit, said central power control unit comprising:
   a power source for supplying said power;
   a control circuit for providing a signal representing an impedance of said supply cable; and
   a regulator receiving said signal from said control circuit and adjusting said power supplied by said power source over said supply cable in response to said signal,
   wherein said control circuit further comprises:
      a controller adapted to receive a signal output from said remote unit and adjust said power supplied by said power source over said supply cable in response to said signal received from said remote unit.

34. The central power unit according to claim 33, wherein said signal indicates a voltage being input to said remote unit.

35. The central power unit according to claim 33, wherein said signal indicates a power level being output by a transmitter in said remote unit.

36. The central power control unit according to claim 35, further comprising:
   a signal source unit connected to said transmitter of said at least one remote power unit, said signal source unit being adapted to prompt said transmitter to output said signal.

37. The central power control unit according to claim 33, wherein said signal is sent from said remote unit to said controller via a telemetry link.

38. The central power control unit according to claim 33, wherein said signal is sent from said remote unit to said controller via said supply cable.

39. The central power unit according to claim 33, wherein said controller includes a processor.

40. The central power unit according to claim 39, wherein said processor includes a microprocessor.

41. A method of controlling a power level delivered from a central power control unit to at least one remote unit, said method comprising the steps of:
   supplying power from a power unit in said central power control unit to said at least one remote power unit via a supply cable;
   determining an impedance of said supply cable; and
   adjusting said level of said power supplied to said at least one remote unit by said central power control unit based upon said determined impedance of said supply cable,
   wherein said step of determining further comprises:
      generating a sweep tone of a known magnitude;
      transmitting said generated sweep tone via said supply cable to said at least one remote unit, said at least one remote unit reflecting said generated sweep tone back to said central unit;
      measuring a magnitude of said reflected sweep tone; and
      determining said impedance of said supply cable based on said measured magnitude of said reflected sweep tone.

42. A method of controlling a power level delivered from a central power control unit to at least one remote unit, said method comprising the steps of:
   supplying power from a power unit in said central power control unit to said at least one remote power unit via a supply cable;
   determining an impedance of said supply cable; and
   adjusting said level of said power supplied to said at least one remote unit by said central power control unit based upon said determined impedance of said supply cable,
   wherein said determining step further comprises:
      generating a pulse in said central power control unit;
      transmitting said generated pulse to said at least one remote unit via said supply cable, said generated pulse being reflected back to said central power control unit by said at least one remote unit; and
      measuring a time delay between said transmission of said generated pulse and receipt of said reflected pulse by said central power control unit; and
   determining said impedance of said supply cable based on said time delay between said transmission of said generated pulse and receipt of said reflected pulse by said central power control unit.

43. A method of controlling a power level delivered from a central power control unit to at least one remote unit, said method comprising the steps of:
   supplying power from a power unit in said central power control unit to said at least one remote power unit via a supply cable;
   determining an impedance of said supply cable; and
   adjusting said level of said power supplied to said at least one remote unit by said central power control unit based upon said determined impedance of said supply cable,
   wherein said determining step further comprises:
      measuring a level of said power at said at least one remote unit;
      sending a signal indicating said measured power level from said at least one remote unit to said central power control unit; and
      determining said impedance of said supply cable based on said signal indicating said measured power level from said at least one remote.

44. The method according to claim 43, wherein said measuring step further comprises:
   measuring a voltage being input to said at least one remote power unit.

45. The method according to claim 43, wherein said measuring step further comprises:
   measuring a power level of a signal being transmitted from a transmitter in said at least one remote power unit.

46. The method according to claim 43, wherein said sending step further comprises:
   sending said signal via a telemetry link between said central power control unit and said at least one remote unit.

47. The method according to claim 43, wherein said sending step further comprises:
   sending said signal via said supply cable between said central power control unit and said at least one remote unit.

* * * * *